C. L. TOLLES.
TRACTION BELT.
APPLICATION FILED MAY 14, 1912.

1,135,559.

Patented Apr. 13, 1915.
2 SHEETS—SHEET 1.

WITNESSES

INVENTOR
CHARLES L. TOLLES
BY
Paul & Paul
ATTORNEYS

C. L. TOLLES.
TRACTION BELT.
APPLICATION FILED MAY 14, 1912.

1,135,559.

Patented Apr. 13, 1915.
2 SHEETS—SHEET 2.

WITNESSES
M. R. McInnis
[signature]

INVENTOR
CHARLES L. TOLLES
BY Paul & Paul
ATTORNEYS

UNITED STATES PATENT OFFICE.

CHARLES L. TOLLES, OF EAU CLAIRE, WISCONSIN.

TRACTION-BELT.

1,135,559.  Specification of Letters Patent.  Patented Apr. 13, 1915.

Application filed May 14, 1912. Serial No. 697,285.

*To all whom it may concern:*

Be it known that I, CHARLES L. TOLLES, of Eau Claire, Eau Claire county, Wisconsin, have invented certain new and useful Improvements in Traction-Belts, of which the following is a specification.

My invention relates to traction belts for use with traction engines in road, field or logging work.

A further object is to provide a belt of strong and durable construction and one which will readily adapt itself to an uneven surface over which the engine may be moving.

A further object is to provide a traction belt which will not easily clog and obstruct the efficiency and pulling power of the engine.

My invention consists generally in various constructions and combinations, all as hereinafter described and particularly pointed out in the claims.

Figure 1:
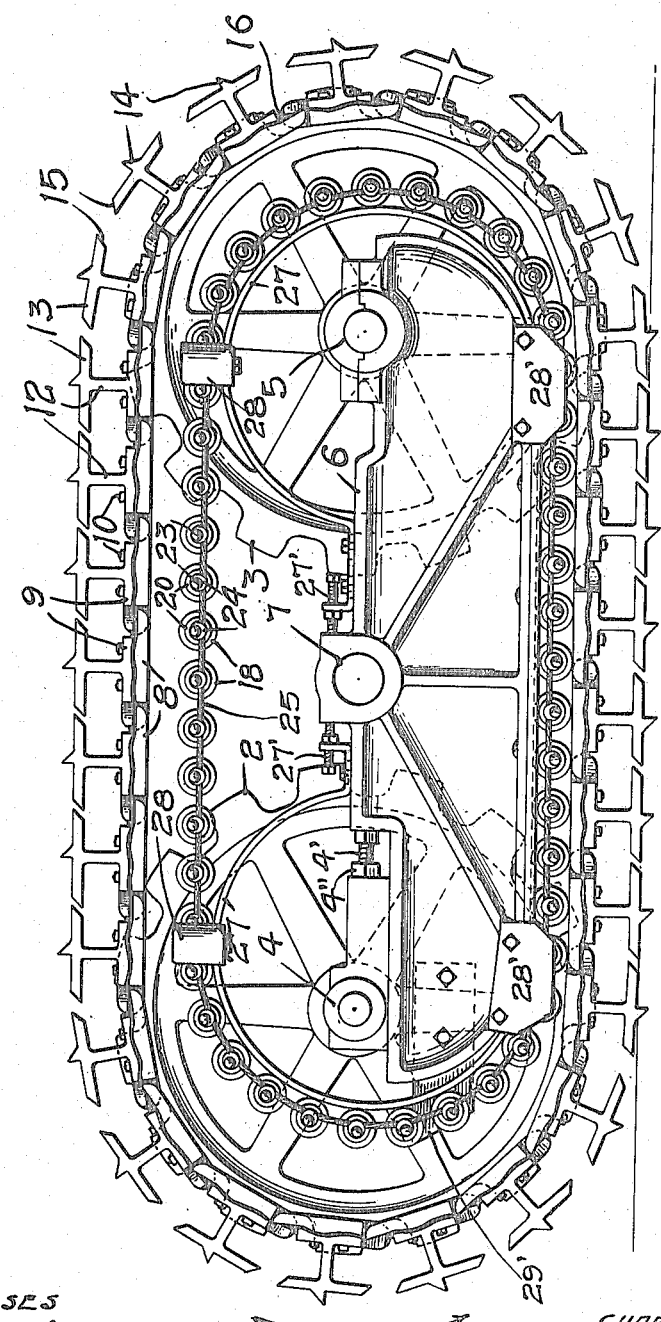
Figure 5:
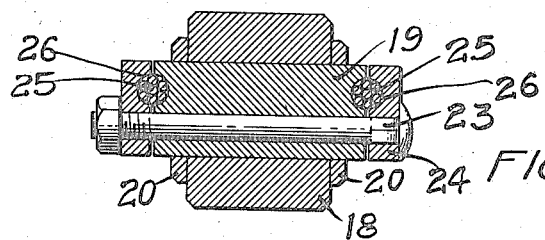
Figure 2:
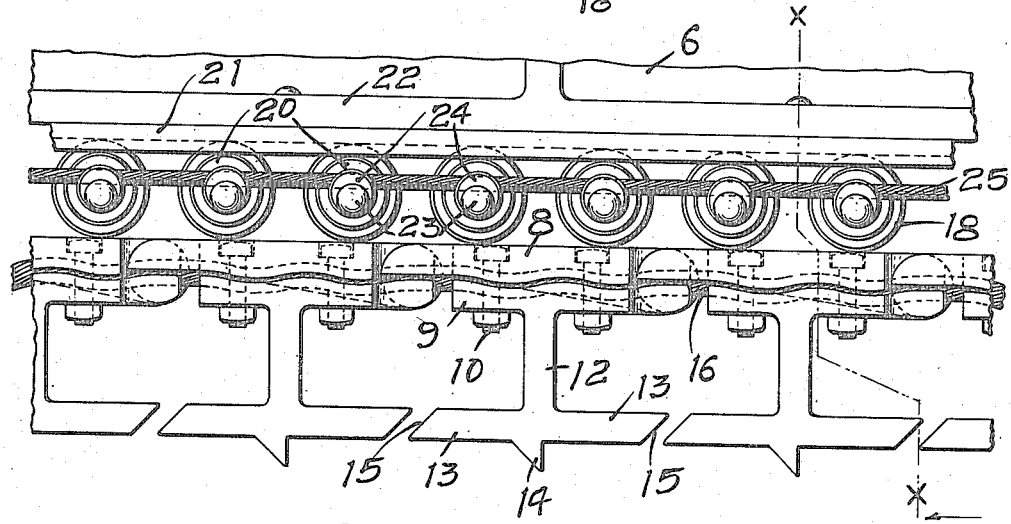
Figures 3, 4:
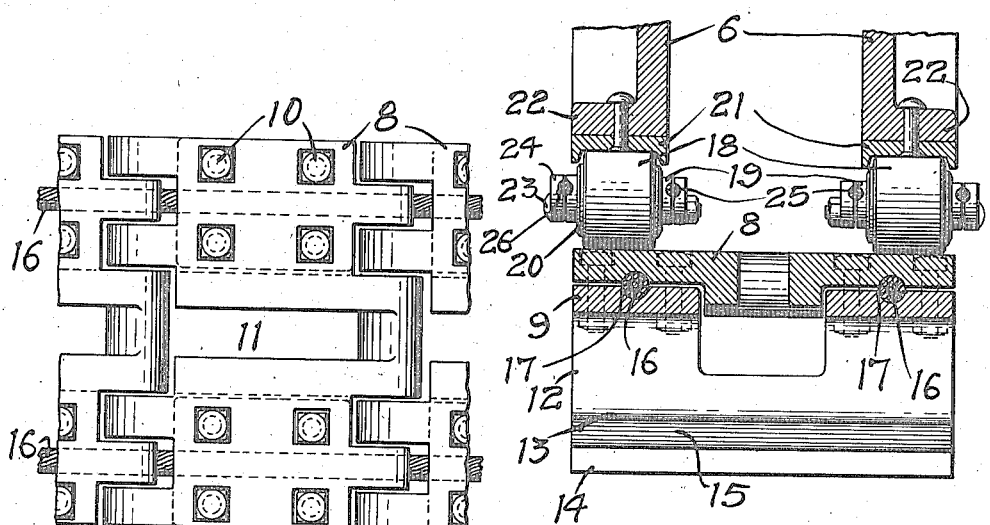

In the accompanying drawings forming part of the specification, Figure 1 is a side elevation of a traction belt embodying my invention, Fig. 2 is a detail view of a portion of the belt, Fig. 3 is a sectional view on the line x—x of Fig. 2, Fig. 4 is a detail plan view illustrating the manner of constructing the belt, Fig. 5 is a detail sectional view of one of the anti-friction rollers with which the lower run of the belt contacts.

In the drawing, 2 and 3 represent sprocket wheels journaled in boxes 4 and 5 in the frame 6, which in turn has a drive shaft 7 on which said frame and the sprocket wheels are adapted to oscillate and allow the belt to conform to the inequalities of the ground over which the machine is moving. For clearness of illustration I have omitted the driving connections between the sprocket wheels and the drive shaft, and for the further reason that my invention relates particularly to the traction belt. The boxes 4 are adjustable in the frame by means of screws 4' having lock nuts 4''. This adjustment allows proper tension on the traction belt to be obtained.

The traction belt proper comprises a series of links, each consisting of an inner plate 8 and an outer plate 9, rigidly secured to the inner plate by suitable means, such as bolts 10. Slots or recesses 11 are provided in the inner plate to receive the teeth of the sprocket wheels 2 and 3. These inner and outer plates constitute a link of the sprocket belt and each outer plate has a web 12 formed thereon projecting outwardly at right angles substantially to the plane of the plates and terminating in a shoe 13 which lies in a plane parallel substantially with the plane of the plates 8 and 9 and is preferably provided on its under surface with a spur or tooth 14. Each end of the shoe is preferably provided with a beveled surface 15. These plates and the web and shoe thereon are preferably made of manganese steel on account of its strength and durability under the rough and hard usage to which a traction belt on a logging engine would naturally be subjected. The webs are of sufficient length to raise the plates 8 and 9 a considerable distance above the shoes, so that in traveling over rough ground or snow and ice the links of the belt will be raised clear of any ordinary obstruction.

Any suitable means may be employed for securing the links of the belt together, but I prefer to provide cables 16, preferably of wire, fitting within tortuous passages or grooves 17 formed in the opposing faces of the plates 8 and 9 and securely gripped by means of the bolts 10. The irregular or tortuous passages or grooves allow the clamping of the links more securely on the cables and prevent them from slipping thereon. Between the lower run of the traction belt and the frame 6 I prefer to provide anti-friction bearings consisting of a series of rolls 18 loosely mounted on studs 19 between rings 20 and adapted to bear on the upper surface of the plates 8 and on the under surface of channel bars 21 secured to flanges 22 at the lower edge of the frame 6, as shown in Fig. 3. Bolts 23 pass lengthwise through the studs and are provided with disks 24 between which and the ends of the studs cables 25 are securely gripped in grooves 26 formed in said disks and studs. Hoops 27 form continuations of the bars 21 and are curved upwardly and inwardly and secured to the upper portion of the frame 6 on opposite sides of the bearing 7. These hoops form bearings for the anti-friction rolls 18 when they pass out of engagement with the links of the traction belt. I prefer also to provide adjusting screws 27' by means of which the hoops 27 can be moved back and forth to obtain the desired tension on the anti-friction belt encircling them.

Suitable guide plates 28 are preferably provided on the upper portion of these hoops to hold the belts in place thereon, and similar guide plates 28' are mounted on the lower portion of the frame and prevent outward or lateral movement of the lower run of the anti-friction belts. Inner guide plates 29' are also mounted on the frame and aid in holding the anti-friction belts in their proper position with respect to said frame.

In operation, the shoes 13 will rest upon the surface over which the machine is moving, raising the links and the cables connecting them a sufficient distance to clear ordinary obstructions which would interfere with the movement of the machine and the operation of the traction belt. Any snow or ice which accumulates between the shoes and the links will be dislodged when the links pass over the sprocket wheels.

In various ways the details herein shown and described may be modified and still be within the scope of my invention.

I claim as my invention:—

1. A traction belt composed of links, each comprising an inner and outer flattened plate, and a continuous flexible means passing between said plates and connecting adjacent links, the outer plates of said links having traction shoes formed thereon, and means securing the plates of each link together and to said flexible means.

2. A traction belt composed of links, each having a transverse web extending outwardly at right angles substantially to the plane of the link and terminating in an elongated shoe which lies in a plane parallel, substantially, with the plane of the link and provided with a tooth or spur on its outer face, and flexible means passing through said links and connecting adjacent links.

3. A traction belt comprising links having centrally arranged sockets therein adapted to receive the teeth of a sprocket wheel, the outer faces of said links having traction surfaces and an endless flexible means included between the inner and outer faces of said links and secured thereto upon each side of said sprocket wheel teeth sockets.

4. A traction belt composed of links, each comprising inner and outer plates having longitudinal grooves therein, cables fitting within said grooves and connecting said links with one another, means for drawing said plates together to clamp them on said cables, and traction shoes carried by said links.

5. A traction belt comprising links, each composed of inner and outer plates, said outer plates having webs formed thereon and traction shoes at the outer portions of said webs, said plates having grooves formed in their opposing faces, cables fitting within said grooves, bolts passing through said plates and clamping them on said cables, said plates having slots or recesses to receive the teeth of a sprocket wheel.

6. In a traction machine, the combination, with a frame, and driven sprocket wheels, of a traction belt and a belt having anti-friction rollers interposed between said frame and said traction belt, said anti-friction roller belt comprising studs, rollers mounted thereon, cables provided at the ends of said studs, disks engaging said cables, and means for clamping said cables, studs, and disks together.

7. A traction belt comprising links, each consisting of an inner and an outer member, the outer member having a traction surface, flexible means passing between the members of each link and having tortuous bearing surfaces in their opposing faces, thereby increasing the area of the frictional surfaces between said members and said flexible means, means securing said members together, said flexible means forming a connection between adjacent links.

8. A traction belt comprising links composed of inner and outer plates, parallel cables interposed between the plates of said links and secured thereto and forming an endless flexible means connecting said links with one another, said outer plates having a traction means thereon.

9. A traction belt comprising a series of links, each composed of an inner and outer member having opposing faces, flexible means extending between said opposing faces, and means securing the plates together and to said flexible means, said outer members having transverse webs formed thereon and traction shoes carried by said webs and transversely thereof, said members having holes or openings therein adapted to receive the teeth of a sprocket wheel.

10. A traction belt comprising a series of links, each composed of an inner and an outer plate having central openings therein to receive the teeth of a sprocket wheel, flexible means passing between the opposing faces of said plates on both sides of the openings therein, bolts passing through said plates upon both sides of said flexible means and said openings and clamping said flexible means securely between said plates, said flexible means connecting adjacent links and said outer plates having traction shoes thereon.

11. A traction belt comprising a series of links, each composed of inner and outer members having openings in their middle portions to receive the teeth of a sprocket wheel, said outer members having comparatively narrow transverse webs formed thereon and projecting outwardly therefrom, and traction shoes carried by said webs and extending transversely thereof, flexible means passing between said members upon each side of the openings therein and connecting adjoining links, and bolts passing through said members upon opposite sides of said flexible means, and in the front and rear of said transverse webs.

12. A traction belt comprising a series of traction sections provided with complemental wearing shoes secured thereto, a track formed on said sections, and a flexible strip clamped between said track and wearing shoes.

13. A traction belt comprising a series of traction sections, a track formed on said sections, wearing shoes secured thereto, and a flexible strip clamped between said track and shoes, said traction sections having articulated attachment with each other.

14. A traction belt comprising a series of links, each composed of an inner and an outer plate having central openings therein to receive the teeth of a sprocket wheel, flexible means passing between the opposing faces of said plates on both sides of the openings therein, belts passing through said plates upon both sides of said flexible means and said openings and clamping said flexible means securely between said plates, said flexible means connecting adjacent links and said outer plates having traction means thereon.

15. A traction belt composed of links, each having a transverse web extending outwardly at right angles substantially to the plane of the link and terminating in an elongated shoe which lies in a plane parallel, substantially, with the plane of the link, and means pivotally connecting the ends of adjacent links.

16. A traction belt composed of links, each having a transverse web extending outwardly at right angles substantially to the plane of the link and terminating in an elongated shoe which lies in a plane parallel, substantially, with the plane of the link and provided with a tooth or spur on its outer face, and means pivotally connecting the ends of each link to the contiguous ends of adjacent links.

In witness whereof, I have hereunto set my hand this 7th day of May, 1912.

CHARLES L. TOLLES.

Witnesses:
F. C. BARLOW,
I. B. ROLAND.